United States Patent Office 2,850,415
Patented Sept. 2, 1958

2,850,415
PROCESS FOR TREATING METALS WITH FERRATE SOLUTION

John Rufford Harrison, Niagara Falls, N. Y., assignor to E. I. du Pont de Nemours and Company, Wilmington, Del., a corporation of Delaware No Drawing. Application September 21, 1954
Serial No. 457,547

8 Claims. (Cl. 148—6.14)

This invention relates to the protection of metallic surfaces against corrosion. More particularly, it relates to preventing the corrosion of ferrous metals by chemically treating the surfaces thereof.

Among the methods for repressing corrosion or for eliminating it entirely are several based on chemical treatments of the metal to be protected. In these processes a metallic base is contacted with active chemicals to form a protective coating in situ. One of the chemical treatments involves coating steel with a layer of inorganic phosphates by immersion in a solution containing metal ions and phosphoric acid. In another chemical treatment steel is "blued" by oxidation in a salt bath.

Copending application S. N. 457,574, filed of even date and of common assignment herewith, discloses a new chemical process for repressing corrosion in which the base metal is contacted with an aqueous solution of the ferrate of an alkali metal. This treatment develops on the metallic surface a film which may be referred to as a "ferrate film" although its exact chemical constitution is unknown. While the film excludes air and moisture and inhibits corrosion for some time, it remains desirable to increase its effectiveness.

A primary object of this invention is therefore provision of a novel and useful improvement in the chemical protection of metals against corrosion. A more specific object is provision of an improvement in the ferrate process of corrosion prevention disclosed by the above-mentioned copending application.

DESCRIPTION OF THE INVENTION

The enumerated and still further objects may be achieved in accordance with this invention by a process in which a film produced by reaction between a metallic workpiece and a ferrate solution is further treated or sealed by immersion in an aqueous solution of either of two reagents, silicates or dichromates, or of mixtures thereof. A film treated in this fashion may be referred to as a "sealed film" and the bath as the "sealing bath."

The preferred reagents of this invention are the dichromates and silicates of the alkali metals, particularly those of sodium and potassium. The form of the silicate employed is immaterial so long as it is readily soluble. Thus sodium and potassium orthosilicates and metasilicates are perfectly acceptable.

The quantity of reagent needed depends to some extent on the salt utilized. When it is utilized alone, the preferred concentration of dichromate, as the sodium or potassium salt, is around 4 or 5% by weight. The concentration of silicate utilized alone is not too critical. Between about 1% and 5% by weight of sodium orthosilicate, for example, is satisfactory. Preferred mixtures of the salts contain, by weight, 1–5% of silicate and 1–3% of dichromate.

The preferred pH for use with the dichromate solutions is the natural pH thereof, about 3.5 for the 5% solution. Increasing the pH slightly, i. e. to 6 or 7, by the use of bases has little effect, but raising it to 10 or 12 decreases the value of the treatment. Lowering the pH to 2.5 is also deleterious.

The preferred pH for use with silicate solution is also the natural pH thereof, i. e. around 12.5. Less alkaline solutions can be used but with impaired effectiveness.

In cases where mixed solutions of dichromates and silicates are utilized, an acidic pH of around 3.5 is desirable. At such a pH the silicate ion will be transformed into colloidal silica. Consequently the term "dichromate-silicate mixtures" is not literally accurate although it will be retained in this specification. Colloidal silica from any source can be used in these mixtures so long as it is not contaminated with other materials or does not possess a particle size too great to react with the ferrate film. In the dichromate-silicate mixtures the percentage of colloidal silica should be around 0.5% by weight.

The effectiveness of the treatment varies rather directly with temperature. Thus at least ambient temperature should be utilized while 50–100° C., and most desirably 90°–100° C., is preferred as a compromise between chemical efficiency and economics. Improved results are, however, obtained by heating the ferrate-treated workpiece under pressure in a 5% dichromate solution maintained in a closed vessel at 140° C., but this procedure may not be economically warranted in all cases.

In the case of dichromate solutions a period of around 4 hours should generally be utilized for the treatment although some improvement can be obtained in as little as one hour. Increasing the time to 8 or 16 hours gives still enhanced results.

Sealing with silicate solutions is about four times as fast as with dichromate. Thus, as good results are obtained by soaking the ferrate film for about one hour in silicate as are obtained by four hours in dichromate under the same temperature conditions.

The preferred sealing solutions are silicate-dichromate mixtures. Thus the effect of a four-hour dichromate treatment can be obtained in 3 minutes with a solution containing 2% by weight of dichromate and 3% of orthosilicate. Conditions for sealing are otherwise about the same as for the dichromate solutions: the pH should be around 3.5 and the temperature at least 50–100° C.

The coatings prepared as described above may be further improved by heat treatment. The workpiece, for example, may be removed from the sealing bath, rinsed in water and dried, and then heated to around 250–350° C. for about an hour in an inert atmosphere. The optimum temperature for the heating is around 300° C. although any temperature within the range noted gives greatly improved corrosion resistance. Since the improvement slowly increases with time, periods of greater than one hour can well be used, 90 minutes being convenient. Oxygen destroys the films and so should not be present in the atmosphere. Hydrogen may reduce the films to the metal and should also be avoided. Gases such as helium and neon or others inert to the film might be substituted for the nitrogen if it is so desired. A film prepared in this manner may be referred to as a "baked sealed film."

While ferrous metals such as cast iron and steel are particularly adapted to treatment by the process described, the invention is not confined thereto. Other commercial metals such as zinc, treated by a ferrate as disclosed heretofore, may be rendered further resistant to corrosion by immersion in dichromate.

The methods of making the alkali ferrates, of pretreating metallic workpiece and of applying the ferrate solutions to the workpieces are shown in the aforesaid copending application.

A preferred process embodying the above-enumerated principles of this invention is as follows: A stainless steel workpiece is pickled for 10 seconds in concentrated hydrochloric acid, rinsed, neutralized by contact for 4 minutes at 75° C. with a dilute caustic solution containing around 0.15% of cyanide and then rinsed again. The steel is then immersed for about one hour in a solution containing 1% of potassium ferrate buffered at pH 11 with sodium carbonate and bicarbonate, preferably saturated with the buffer. The steel is again rinsed and heated at 90–100° C. for about three minutes in a solution at a pH around 3.5 containing 2% dichromate and 3% orthosilicate. The workpiece, after the sealing treatment, is rinsed and dried and heated in nitrogen at 300° C. for around 90 minutes. The corrosion resistance so obtained surpasses in some respects that imparted by other chemical treatments.

EXAMPLES

The following examples illustrate details of the invention.

The steel strips utilized as workpieces possessed ferrate films prepared by one-hour immersions at room temperature in one molar carbonate-bicarbonate buffer containing 1% of potassium ferrate at pH 11.

The corrosion tests were carried out by suspending the steel strips for several hours at around 40° C. in the closed air-space within an eight liter glass vessel containing 150 ml. of water carrying dissolved sodium pyrosulfite, $Na_2S_2O_5$, and two drops of concentrated sulfuric acid. Unless otherwise noted, the initial pyrosulfite content of the water was 0.025 g. The sulfur dioxide evolved from the acidified pyrosulfite solution passed into the air-space above the water and set up conditions simulating those of a highly corrosive industrial atmosphere.

In these examples, all percentages given are by weight.

Example 1

This example shows the use of dichromate solution to seal the ferrate films.

(a) Two ferrate-treated samples were heated to 90–100° C. for 4½ hours, one in an aqueous solution containing 5% potassium dichromate and one in water. The pH of the dichromate solution was about 3.5–3.7. The strips were subjected to corrosion tests along with a third strip carrying an unsealed ferrate film. After 23 hours in the test chamber, the water of which contained three times the usual amount of $Na_2S_2O_5$, the blanks were fairly badly corroded, that "sealed" in water being much worse than the other. The dichromate-treated sample was much less corroded than either of the blanks, and still exhibited little corrosion after a further 24 hours' exposure to the test atmosphere.

(b) A steel strip carrying a ferrate film was heated for 4½ hours at 90–100° C. in 5% $K_2Cr_2O_7$ solution adjusted to pH 2.5 with chromic acid ($CrO_3$). This sample was tested as described in 1(a) and was very badly corroded.

(c) The example of 1(b) was repeated except that a 5% solution of $K_2Cr_2O_7$ adjusted to pH 6.7 with KOH was used as the sealing medium. This sample received the same degree of protection as that treated with the pH 3.7 solution.

(d) The example of 1(b) was repeated except that a $K_2Cr_2O_7$ solution adjusted to pH 12.2 with KOH was employed as the sealing liquid. This sample received no protection.

(e) The example of 1(b) was repeated except that the 5% solution of $K_2Cr_2O_7$ was applied only for 2 hours. This received protection intermediate that of an untreated sample and that of one treated for 4½ hours.

(f) Three ferrate-treated samples were heated for 4½ hours with $K_2Cr_2O_7$ at concentrations of 2½, 5 and 10% and natural pH's. The best protection was given by the 5% solution but both of the other two solutions gave noticeable protection.

Example 2

This example shows the use of a solution of sodium orthosilicate to seal the film.

(a) Part of a ferrate-treated sample was heated to 90–100° C. for one hour with a 5% solution of "standard sodium orthosilicate" (Diamond Alkali Co.). It was then tested in the corrosion chamber for 19 hours, the aqueous solution of the chamber containing 0.075 g. of sodium pyrosulfite, along with a sample sealed by immersion for four hours in a 5% $K_2Cr_2O_7$ solution at the same temperature. The degree of protection afforded the silicate-treated part of the one sample was as good as that on the dichromate-treated part of the other.

(b) The example of 2(a) was repeated, except that one strip was treated in the silicate solution for only 20 minutes. The degree of protection afforded this sample was much less than that given the dichromate-treated sample.

(c) Samples were heated for 20 minutes with sodium orthosilicate solutions at concentrations of 1, 2, 3, 4 and 5%. The degree of corrosion inhibition was found to be largely independent of silicate concentration.

(d) Ferrate-treated samples were heated to 90–100° C. for 20 minutes with 3% sodium orthosilicate solutions respectively adjusted by means of HCl to pH 2.2, 7.0 and 9.0. A similar test was carried out in a solution at the natural pH of 3% sodium orthosilicate, i. e. 12.2. The best corrosion inhibition was obtained from the solution at its natural pH, the protection decreasing as the pH was lowered. Some improvement was still noticeable, however, at the lowest pH.

Example 3

This example shows the use of silicate-dichromate mixtures to seal the ferrate film, and represents the preferred embodiment of the invention.

(a) Ferrate-treated samples were heated to 90–100° C. for 1, 3, 5, 10 and 20 minutes in a solution containing simultaneously 3% $Na_4SiO_4$ and 2% $Na_2Cr_2O_7$ adjusted to pH 3.5 with $CrO_3$. The samples were then tested in the corrosion chamber along with a sample sealed by heating with 5% $K_2Cr_2O_7$ for 4 hours. The samples treated for 3 minutes showed the same resistance as that treated for four hours in dichromate alone. The sample treated for 20 minutes was almost as well protected as this, but 1, 5 and 10 minute treatments appeared somewhat less efficient.

(b) Samples carrying a ferrate film were treated for 20 minutes at 90–100° C. in solutions containing varying proportions of silicate and dichromate, all adjusted to pH 3.5 with $CrO_3$. Corrosion tests showed that the samples treated in solutions containing 3% silicate and 1 or 3% dichromate had the greatest resistance. With 1% silicate and 3% dichromate the sealed coating produced was not quite as good. The sealed coating was slightly worse again with 10% silicate and 3% dichromate and with 3% silicate, either alone or with 10% dichromate.

(c) Ferrate-treated samples were heated for 3 minutes in solutions containing 3% silicate and 2% dichromate adjusted to various hydrogen ion concentrations with $CrO_3$. The film sealed at pH 3.5 had the greatest corrosion resistance while those sealed at 5.0 and 12.3 were not quite as good. The silicate gelled at pH 7.8 and the solution enhanced corrosion protection very little. No improvement in the film was noticeable at pH 2.3.

(d) Samples were heated for 20 minutes with solutions containing 3% of silicate and 5% of dichromate adjusted to pH 3.5 with various acids. Sulfuric, nitric and hydrochloric acids gave sealed films with good corrosion resistance. Acetic and phosphoric acids, on the contrary, appeared to destroy the film.

A film sealed in the presence of nitric acid was then compared directly with one sealed in the presence of chromic acid. The films treated in nitric acid showed considerable corrosion after 36 hours whereas those samples treated in chromic acid were hardly affected.

Example 4

This example shows the use of sodium metasilicate to seal ferrate films.

One ferrate-treated sample was heated for 3 minutes with 3% sodium orthosilicate solution containing 2% of sodium dichromate and adjusted to pH 3.5 with chromic acid. A second sample was treated similarly except that 2% sodium metasilicate was substituted for the 3% orthosilicate. In subsequent tests both samples exhibited the same degree of corrosion.

Example 5

This example shows the effect of a sealed ferrate film on zinc.

Two samples of metallic zinc were cleaned with hot 10% NaOH and rinsed. The surface of each was bright and lustrous after this treatment. The samples were then partially immersed for one hour in the 1% ferrate solution buffered at pH 11 utilized in the previous tests. The samples were withdrawn, rinsed and dried, still retaining their lustre. One of the samples was then given an additional immersion for four hours in a hot aqueous bath containing 5% of potassium dichromate.

Both samples were suspended in the corrosion chamber. The untreated parts were badly corroded at the end of 17 hours, the lustre being replaced by a white deposit of zinc oxide. The ferrate treated sample retained its lustre for about 20 hours. The ferrate-dichromate treated sample, on the other hand, showed only a few white spots at the end of 20 hours, the remainder of the dichromate treated area remaining bright.

COLORING METALS

In addition to their obvious value as barriers against corrosion, the sealed ferrate films of this invention have other utilities. In some cases, for example, the films greatly increase the adherence of paint to the base metal. Steel treated with ferrate and dichromate in succession accepts a primer paint coat much more readily than steel not so treated or treated with ferrate alone, and the adhesion is thereby greatly improved.

A further important property of films sealed with dichromate is their ability to retain dyes. Thus, steel treated with ferrate and dichromate in succession can easily be colored by any of a number of basic dyes. No neutral or acid dye was found which influenced the film. Basic dyes which adhere to the films include the following: Du Pont Brilliant Milling Blue B, Du Pont Milling Red R, "Pontacyl" Fast Violet VR, "Pontacyl" Violet 10B, "Pontacyl" Violet 4BL, Patent Blue AF, Du Pont Victoria Pure Blue BO, Du Pont Methyl Violet, "Pontachrome" Azure Blue B, "Pontacyl" Violet C4BN, "Pontacyl" Fast Violet 10B, "Pontacyl" Green BL, "Pontacyl" Brilliant Blue V, "Pontacyl" Brilliant Blue A, "Pontacyl" Green NV, Du Pont Brilliant Green, Du Pont Victoria Green, and Du Pont Victoria Blue B. It is thus evident that practically the entire color spectrum can be imparted to steel by the methods of this invention. In a few cases the basic dyes colored both metal and film but in the majority they colored the film only. The corrosion resistance of the sealed films was generally not altered by dyeing them.

Having described my invention, I claim:

1. The method of imparting corrosion resistance to and improving the dye-receptive properties of a metal selected from the group consisting of ferrous metals and zinc which comprises sequentially contacting said metal with an aqueous solution of a metallic ferrate at a temperature no greater than about 50° C. and then with an aqueous solution containing about 1–5% by weight of a member of the group consisting of silicates, dichromates and mixtures thereof with each other at a temperature not above about 140° C.

2. The method of improving the corrosion resistance and dye-receptive properties of a ferrate film deposited on a metal selected from the group consisting of ferrous metals and zinc which comprises contacting said film with an aqueous solution containing about 1–5% by weight of a silicate at a pH of around 12.5 and a temperature of around 50–100° C.

3. The method of improving the corrosion resistance and dye-receptive properties of a ferrate film deposited on a metal selected from the group consisting of ferrous metals and zinc which comprises contacting said film with an aqueous solution containing about 1–5% by weight of a dichromate at a pH of around 3.5 and a temperature of around 50–100° C.

4. The method of improving the corrosion resistance and dye-receptive properties of a ferrate film deposited on a metal selected from the group consisting of ferrous metals and zinc which comprises contacting said film with an aqueous solution containing about 1–5% by weight of a dichromate-silicate mixture at a pH of around 3.5 and a temperature of around 50–100° C.

5. The method of claim 4 in which the film is contacted with the aqueous solution for around 3 minutes.

6. The method of claim 1 including the additional step of baking the film in an inert atmosphere after contacting the same with the aqueous solution of a member of the group consisting of silicates, dichromates and mixtures thereof with each other.

7. The method of claim 6 in which the baking temperature is about 200–300° C.

8. A workpiece of a metal selected from the group consisting of ferrous metals and zinc treated in the manner of claim 1.

References Cited in the file of this patent

UNITED STATES PATENTS

| | | |
|---|---|---|
| 1,440,092 | Mai | Dec. 26, 1922 |
| 2,295,063 | Tuttle | Sept. 8, 1942 |
| 2,578,400 | Cohn | Dec. 11, 1951 |

FOREIGN PATENTS

| | | |
|---|---|---|
| 218,619 | Great Britain | Apr. 29, 1924 |
| 133,431 | Austria | July 4, 1949 |

OTHER REFERENCES

Mellor: Comprehensive Treatise on Inorganic and Theoretical Chem., vol. 13, pages 930, 933.

J. Phy. Chem., 40, 1936, page 37.

Transactions of Am. Electrochemical Society, 29, page 251 (1916).